US011599745B2

(12) United States Patent
Hunt (10) Patent No.: US 11,599,745 B2
(45) Date of Patent: Mar. 7, 2023

(54) SYSTEM AND METHOD FOR GENERATING SYNTHETIC TRAINING DATA

(71) Applicants: Denso International America, Inc., Southfield, MI (US); DENSO CORPORATION, Aichi (JP)

(72) Inventor: Shawn Hunt, Bethel Park, PA (US)

(73) Assignees: Denso International America, Inc., Southfield, MI (US); DENSO CORPORATION, Aichi (JP)

( * ) Notice: Subject to any disclaimer, the term of this patent is extended or adjusted under 35 U.S.C. 154(b) by 203 days.

(21) Appl. No.: 16/910,718

(22) Filed: Jun. 24, 2020

(65) Prior Publication Data

US 2021/0406597 A1    Dec. 30, 2021

(51) Int. Cl.
*G06K 9/62* (2022.01)
*G06N 20/00* (2019.01)
*G06T 7/73* (2017.01)
*G06V 20/56* (2022.01)

(52) U.S. Cl.
CPC ........... *G06K 9/6256* (2013.01); *G06N 20/00* (2019.01); *G06T 7/75* (2017.01); *G06V 20/56* (2022.01); *G06T 2207/10028* (2013.01); *G06T 2210/12* (2013.01)

(58) Field of Classification Search
CPC ........ G06K 9/6256; G06N 20/00; G06N 3/04; G06T 7/75; G06T 2207/10028; G06T 2210/12; G06T 11/00; G06V 20/56; G06V 10/82; G01S 17/931
See application file for complete search history.

(56) References Cited

U.S. PATENT DOCUMENTS

| 10,643,320 | B2* | 5/2020 | Lee | G06T 5/005 |
| 11,092,966 | B2* | 8/2021 | ReMine | G06N 3/088 |
| 11,094,134 | B1* | 8/2021 | Fallin | G06T 15/506 |
| 2018/0343399 | A1* | 11/2018 | Lull | H04N 1/3871 |
| 2019/0080206 | A1* | 3/2019 | Hotson | G06K 9/6264 |
| 2019/0362504 | A1* | 11/2019 | Hunt | G06T 7/246 |
| 2019/0370666 | A1* | 12/2019 | Ros Sanchez | G06N 3/084 |

(Continued)

OTHER PUBLICATIONS

Want et al., "Automatic Generation of Synthetic LiDAR Point Clouds for 3-D Data Analysis," IEEE Transactions on Instrumentation and Measurement, vol. 68, Issue 7, 3 pages (2019).

(Continued)

*Primary Examiner* — Wesley J Tucker
(74) *Attorney, Agent, or Firm* — Christopher G. Darrow; Darrow Mustafa PC (57) ABSTRACT

A system for generating synthetic training data may include one or processors and a memory in communication with the one or more processors and having a receiving module, a duplication module, and an insertion module. The modules have instructions that when executed by the one or more processors cause the one or more processors to receive original training data being in the form of a three-dimensional point cloud and having one or more original objects formed by at least a portion of the three-dimensional point cloud and annotated with original annotation data, duplicate one of the one or more original objects to generate a synthetic object, and insert the synthetic object within the original training data to generate the synthetic training data.

20 Claims, 6 Drawing Sheets

(56) References Cited

U.S. PATENT DOCUMENTS

| | | | |
|---|---|---|---|
| 2021/0035352 A1* | 2/2021 | Harviainen | G06T 15/20 |
| 2021/0072397 A1* | 3/2021 | Caspers | G01S 17/931 |
| 2021/0150807 A1* | 5/2021 | Zhou | G06V 20/56 |
| 2021/0319363 A1* | 10/2021 | Gillberg | G06V 20/10 |
| 2021/0366205 A1* | 11/2021 | Juppe | G06N 3/04 |

OTHER PUBLICATIONS

Hurl et al., "Precise Synthetic Image and LiDAR (PreSIL) Dataset for Autonomous Vehicle Perception," 8 pages, arXiv:1905.00160v2 [cs CV] May 7, 2019.

Fang et al., "Augmented LiDAR Simulator for Autonomous Driving," pp. 1-10, arXiv:1811.07112v2 [cs.CV] Apr. 10, 2019.

Richter et al., "Playing for Data: Ground Truth from Computer Games," 16 pages, arXiv:1608.02192v1 [cs.CV] Aug. 7, 2016.

Ros et al., "The SYNTHIA Dataset: A Large Collection of Synthetic Images for Semantic Segmentation of Urban Scenes," IEEE Conference on Computer Vision and Pattern Recognition (CVPR), pp. 3234-3243 (2016).

\* cited by examiner

SYSTEM AND METHOD FOR GENERATING SYNTHETIC TRAINING DATA

TECHNICAL FIELD

The subject matter described herein relates, in general, to systems and methods for generating synthetic training data.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some machine learning algorithms build a mathematical model based on sample data, commonly referred to as training data, to make predictions or decisions without being explicitly programmed to do so. Essentially, the machine learning algorithm receives training data and based on the output of the machine learning algorithm, will have one or more weights of the machine learning algorithm adjusted.

One form of training a machine learning algorithm involves supervised training. Supervised training involves the use of annotated training data. Annotated training data is training data that includes the data to be processed, as well as an annotation regarding the correct prediction or decision that should be reached by the machine learning algorithm being trained. For example, if the machine learning algorithm is being trained to determine if an image is that of either a cat or a dog, the training data would include images of cats and dogs, as well as an annotation indicating if the image is actually of a cat or dog. During supervised training, the images would be provided to the machine learning algorithm and based on the output of the machine learning algorithm and the annotation data, the one or more weights of the machine learning algorithm will be adjusted. Over time, the machine learning algorithm will be adjusted such that it can accurately determine or predict whether an image contains a dog or a cat.

One drawback of training a machine learning algorithm in a supervised training fashion is that the training data must include annotations. Annotating training data is generally performed manually, by a human operator. As such, in the example given above, the human operator must review each image, determine if the image is that of a cat or dog, and then annotate the image with the correct answer.

This difficulty in annotating data to generate sets of raining data is compounded in more complex applications, such as in the training of machine learning-based object detection algorithms currently being developed for the use in vehicles. Moreover, machine learning-based object detection algorithms require a significant amount of training data to properly train the object detection algorithm to recognize a plethora of different objects that may surround a vehicle.

SUMMARY

This section generally summarizes the disclosure and is not a comprehensive explanation of its full scope or all its features.

In one embodiment a system for generating synthetic training data may include one or more processors and a memory in communication with the one or more processors. The memory may include a receiving module, a duplication module, and an insertion module. The receiving module may have instructions that, when executed by the one or more processors, cause the one or more processors to receive original training data. The original training data may be in the form of a three-dimensional point cloud and having one or more original objects formed by at least a portion of the three-dimensional point cloud. The one or more original objects may be annotated with original annotation data.

The duplication module may have instructions that, when executed by the one or more processors, cause the one or more processors to duplicate one of the one or more original objects to generate a synthetic object. The synthetic object may be formed of duplicate portions of the three-dimensional point cloud that formed the one of the one or more original objects and be annotated with synthetic annotated data. The synthetic annotated data may be a duplication of the original annotation data of the one or more original objects.

The insertion module may include instructions that, when executed by the one or more processors, cause the one or more processors to insert the synthetic object within the original training data to generate the synthetic training data.

In another embodiment, a method for generating synthetic training data may include the steps of receiving original training data being in the form of a three-dimensional point cloud and having one or more original objects formed by at least a portion of the three-dimensional point cloud and being annotated with original annotation data, duplicating one of the one or more original objects to generate a synthetic object being formed of duplicate portions of the three-dimensional point cloud that formed the one of the one or more original objects and being annotated with synthetic annotated data, and inserting the synthetic object within the original training data to generate the synthetic training data.

In yet another embodiment, a non-transitory computer-readable medium storing instructions for generating synthetic training data that, when executed by one or more processors, cause the one or more processors to receive original training data being in the form of the three-dimensional point cloud and having one or more original objects formed by at least a portion of the three-dimensional point cloud and being annotated with original annotation data, duplicate one of the one or more original objects to generate a synthetic object being formed of duplicate portions of the three-dimensional point cloud that formed the one of the one or more original objects and being annotated with synthetic annotated data, and insert the synthetic object within the original training data to generate the synthetic training data.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described is a system and method for generating synthetic training data. As stated in the background section, supervised training of a machine learning algorithm requires the use of training data that is paired with annotated data. The annotated data contains the information that the machine learning algorithm is being trained to accurately predict. However, the annotation of the training data is a time-consuming and tedious process, greatly limiting the amount of training data available for training a machine learning algorithm.

The system and method generate synthetic training data that may be utilized to train the machine learning algorithm. The synthetic generated training data is based on original training data that may have been manually generated. Moreover, the system and method are able to duplicate the original training data, along with the annotations, and then insert the duplicated training data into the original training data, thus generating synthetic training data. The duplicated training data may undergo one or more transformations before insertion.

In one example, the original training data may be point cloud information for training an object detection algorithm for an autonomous vehicle system. The original training data may include a number of different objects that may be formed by one or more points of the point cloud information. These objects may be annotated. The system and method can copy these objects, along with their annotations, and then reinsert them into the original training data. By so doing, the training data will now include more objects. Furthermore, before insertion is performed, the duplicated objects may be transformed, such as rotated, inverted, and the like before being inserted. As such, the training data can include not only additional objects but objects that have been transformed to better train the object detection algorithm, Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated or autonomous systems, and thus benefits from the functionality discussed herein. In other examples, instead of a vehicle 100 or another robotic device, the system may simply be an object detection system that is able to receive information, such as point cloud information from a LIDAR sensor, and determine the presence of one or more objects in the information.

In various embodiments, the automated/autonomous systems or combination of systems may vary. For example, in one aspect, the automated system is a system that provides autonomous control of the vehicle according to one or more levels of automation, such as the levels defined by the Society of Automotive Engineers (SAE) (e.g., levels 0-5). As such, the autonomous system may provide semi-autonomous control or fully autonomous control, as discussed in relation to the autonomous driving module(s) 160.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Figure 1:
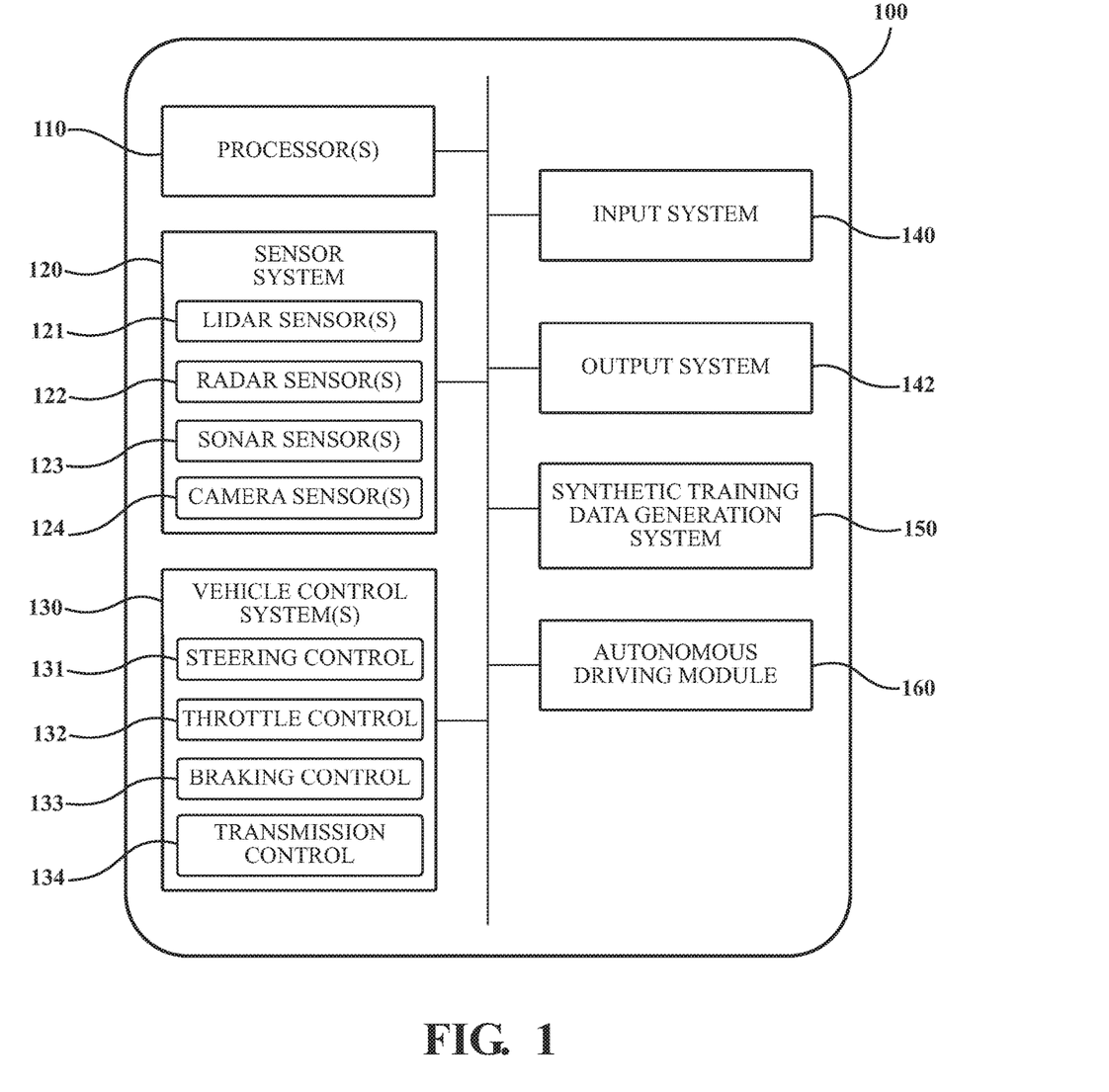
FIG. 1 illustrates a vehicle incorporating a synthetic training data generation system.

Some of the possible elements of the vehicle 100 are shown in FIG. 1 and will be described along with subsequent figures. However, a description of many of the elements in FIG. 1 will be provided after the discussion of FIGS. 2-8 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In either case, the vehicle 100 may include a synthetic training data generation system 150. As will be explained in this specification, the synthetic training data generation system 150 has the ability to generate synthetic training data by utilizing original training data, which may have been manually generated. Moreover, the synthetic training data generation system 150 is able to duplicate objects within the original training data and then reinsert them into the original data to generate synthetic training data. Additionally, before insertion, the duplicated objects may be transformed, such as being rotated, inverted, and the like. By so doing, additional objects can be inserted into the training data without the need of manually collecting and annotating information.

Figure 2:
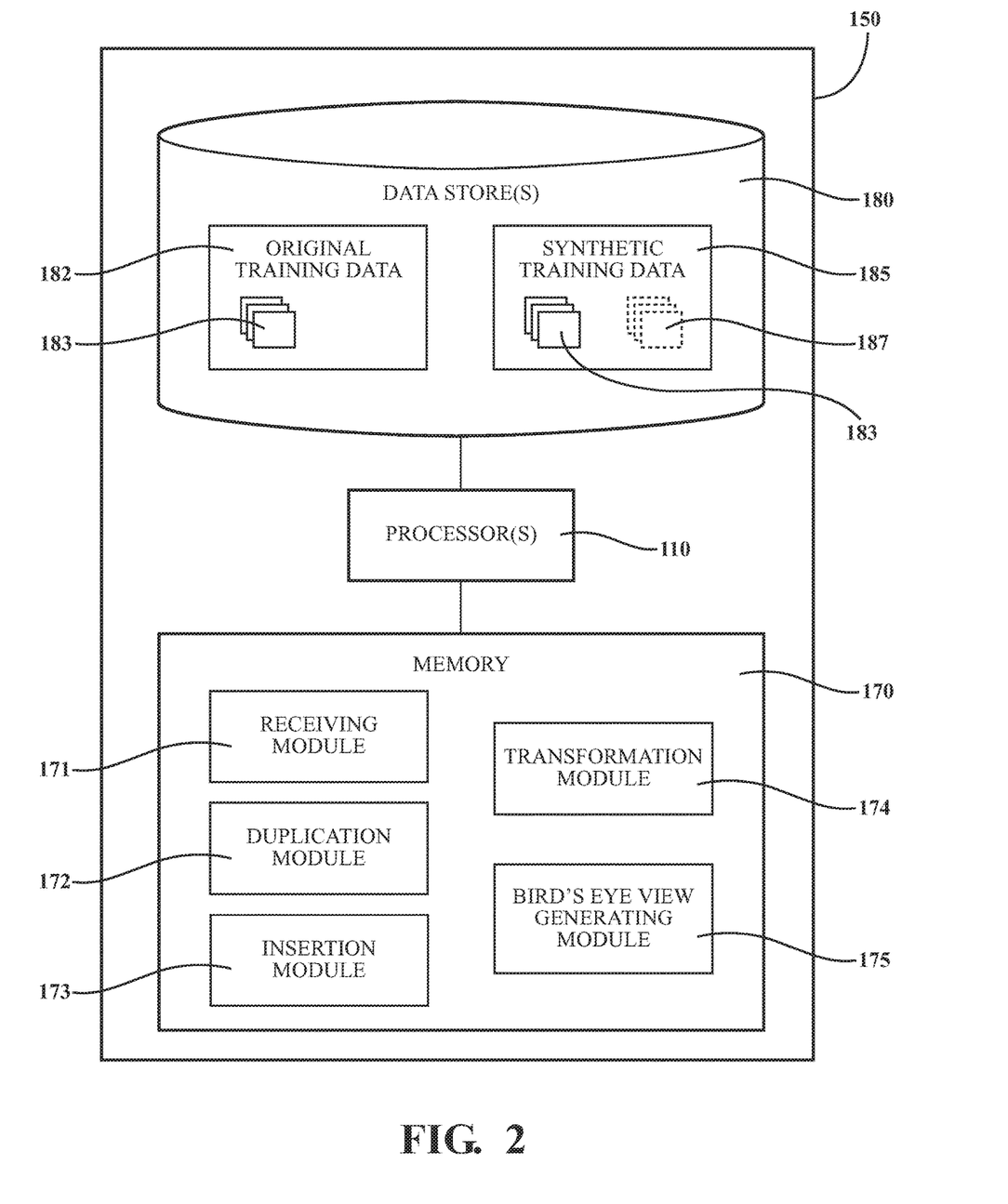
FIG. 2 illustrates a more detailed view of the synthetic training data generation system.

With reference to FIG. 2, one embodiment of the synthetic training data generation system 150 is further illustrated. As shown, the synthetic training data generation system 150 may include one or more processor(s) 110. Accordingly, the processor(s) 110 may be a part of the synthetic training data generation system 150 or the synthetic training data generation system 150 may access the processor(s) 110 through a data bus or another communication path. In one or more embodiments, the processor(s) 110 is an application-specific integrated circuit that is configured to implement functions associated with a receiving module 171, a duplication module 172, an insertion module 173, a transformation module 174, and/or a bird's eye view generating module 175.

In general, the processor(s) 110 is an electronic processor such as a microprocessor that is capable of performing various functions as described herein. In one embodiment, the synthetic training data generation system 150 includes a memory 170 that stores the receiving module 171, the duplication module 172, the insertion module 173, the transformation module 174, and/or the bird's eye view generating module 175. The memory 170 is a random-access memory (RAM), read-only memory (ROM), a hard disk drive, a flash memory, or other suitable memory for storing the modules 171-175. The modules 171-175 are, for example, computer-readable instructions that, when executed by the processor(s) 110, cause the processor(s) 110 to perform the various functions disclosed herein.

Furthermore, in one embodiment, the synthetic training data generation system 150 includes one or more data store(s) 180. The data store(s) 180 is, in one embodiment, an electronic data structure such as a database that is stored in the memory 170 or another memory and that is configured with routines that can be executed by the processor(s) 110 for analyzing stored data, providing stored data, organizing stored data, and so on. Thus, in one embodiment, the data store(s) 180 stores data used or generated by the modules 171-175 in executing various functions.

In one embodiment, the data store(s) 180 may store original training data 182 that may be in the form of one or more three-dimensional point clouds. A three-dimensional point cloud may be a set of data points in a three-dimensional space. Three-dimensional point clouds are generally produced by 3D scanners, such as LIDAR sensors, which measure many points on the external surfaces of objects around them. The original training data 182 may include one or more original objects 183 formed within at least a portion of the points of the one or more three-dimensional point clouds of the original training data. Because this training data may be utilized in supervised training, the original objects 183 may be paired with annotations. The annotations indicate that a collection of points represents an object. The object may be annotated with a bounding box that may include some other information, such as the type of object. For example, the type of object may be a pedestrian, vehicle, large vehicle, building, road, sign, etc. This original training data 182 essentially acts as a ground truth for training one or more machine learning algorithms.

As explained previously, the original training data 182 is the original annotated training data that was manually annotated, which can be a time-consuming and tedious process. The data store(s) 180 may also include synthetic training data 185. The synthetic training data 185 may be in the form of one or more point clouds, similar to the original training data 182, and may include several objects formed by at least a portion of the points that make up the one or more point clouds. Some of these objects may be the original objects 183 found in the original training data. However, in addition, or in the alternative, the synthetic training data may also include synthetic objects 187 that are paired with synthetic annotations.

As will be explained later in this specification, the synthetic objects 187 may be objects that have been duplicated from the original objects 183 and inserted into the original training data 182 so as to create the synthetic training data 185. In addition to duplication, the synthetic objects 187 may also be transformed, for example, rotated, flipped, inverted, and the like and then inserted into the one or more point clouds that make up the synthetic training data 185. By so doing, additional objects can be added into the training data that are already annotated and did not require the tedious process of manual annotation.

With regard to the receiving module 171, the receiving module 171 may include instructions that, when executed by the processor(s) 110, cause the processor(s) 110 to receive the original training data 182. The original training data 182 may then be stored in the data store(s) 180. As stated before, the original training data 182 may be in the form of a three-dimensional point cloud and may have one or more original objects 183 being annotated with original annotation data.

Figure 3:
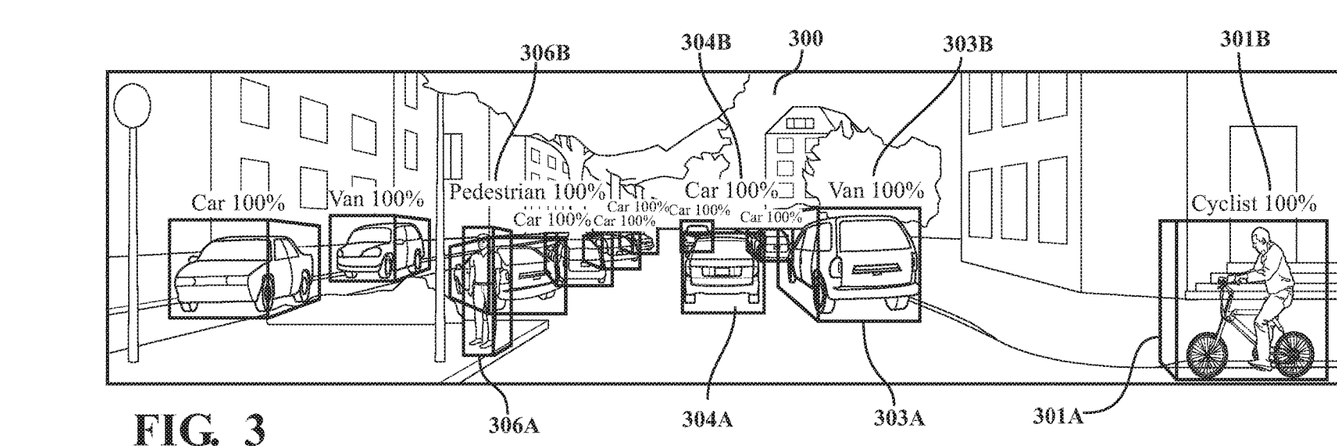
FIG. 3 illustrates an example of a street scene that includes a plurality of different objects and have been annotated with annotation data in the form of a bounding box and object type associated with each bounding box for each object.

For example, referring to FIG. 3, this figure illustrates a scene 300 from a city street. The scene 300 includes numerous objects, such as cars, vans, cyclists, and pedestrians. In this example, a cyclist has been identified and annotated. The annotation includes, in this example, a bounding box 301A that identifies the general location of the cyclist and an object identifier information 301B that identifies that the object is a cyclist. The scene 300 also includes other objects, such as a van (annotated with the bounding box 303A and the identifier 303B), an automobile (annotated with the bounding box 304A and the identifier 304B), and a pedestrian (annotated with the bounding box 306A and the identifier 306B), as well as some other objects.

Figure 4:
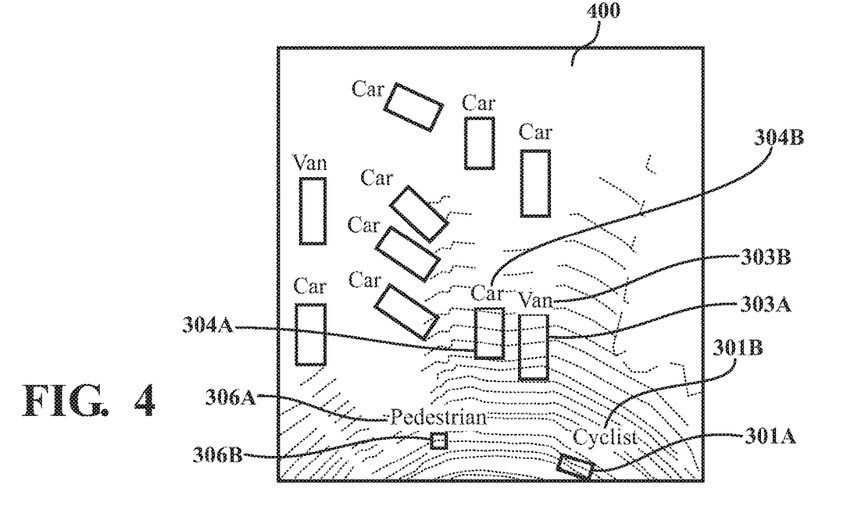
FIG. 4 illustrates a bird's eye view of the street scene of FIG. 3 that shows the training data that includes the plurality of different objects and the annotation data.

Generally, object detection systems, when receiving three-dimensional point cloud data from a sensor, such as a LIDAR sensor, may convert the three-dimensional point cloud data to a two-dimensional bird's eye view. For example, FIG. 4 illustrates a two-dimensional bird's-eye view 400 of the scene 300 of FIG. 3. Like before, the two-dimensional bird's eye view 400 includes the van (annotated with the bounding box 303A and the identifier 303B), the automobile (annotated with the bounding box 304A and the identifier 304B), and the pedestrian (annotated with the bounding box 306A and the identifier 306B), as well as some other objects. In some cases, human operators may add annotations to the training data, such as the bounding boxes 301A-306A and the object identifiers 301B-306B, by adding the annotations when viewing the scene 300 in the two-dimensional bird's eye view 400. Generally, this makes it easier for the human annotators to annotate the objects located within the scene 300, as they have an overhead view of the scene 300.

It should be understood that the type of annotations made to the training data may vary from application to application. In the above application, the training data was in the form of one or more three-dimensional point clouds that include one or more objects that are annotated with a bounding box and an object identifier. However, more information, less information, or other kinds of information may be utilized to annotate objects found within the three-dimensional point cloud data. Furthermore, the original training data 182 does not necessarily need to be in the form of one or more three-dimensional point clouds, but could be in other forms, such as two-dimensional information or could be a multi-dimensional data structure.

Referring back to FIG. 2, the duplication module 172 may include instructions that, when executed by the processor(s) 110, cause the processor(s) 110 to duplicate one of the one or more original objects 183 to generate a synthetic object 187. The synthetic object 187 is formed of duplicate portions of the three-dimensional point cloud that formed one of the one or more original objects 183 and being annotated with synthetic annotated data. The synthetic annotated data may be a duplication of the original annotation data of the one or more original objects 183.

The insertion module 173 may include instructions that, when executed by the processor(s) 110, cause the processor(s) 110 to insert the synthetic object 187 within the original training data 182 to generate the synthetic training data 185. In this example, the synthetic training data 185 is shown as a separate entity from the original training data 182. However, it should be understood that the insertion module 173 may cause the processor(s) 110 to simply insert the synthetic object 187 into the original training data 182. As such, the synthetic objects 187 of the synthetic training data 185 may actually be inserted into the original training data 182 instead of generating a secondary set of training data in the form of the synthetic training data 185.

The synthetic training data generation system 150 may also include a transformation module 174. The transformation module 174 includes instructions that, when executed by the processor(s) 110, cause the processor(s) 110 to transform the synthetic object 187 with respect to an ego vehicle. Essentially, the transformation module 174 may transform a synthetic object 187 before it is inserted into the original training data 182 and/or the synthetic training data 185. In order to better understand this, reference is made to FIG. 5. This figure illustrates training data 500, in the form of a three-dimensional point cloud, surrounding an ego vehicle 502. The training data 500, in this example, could be viewed as the original training data 182.

Figure 5:
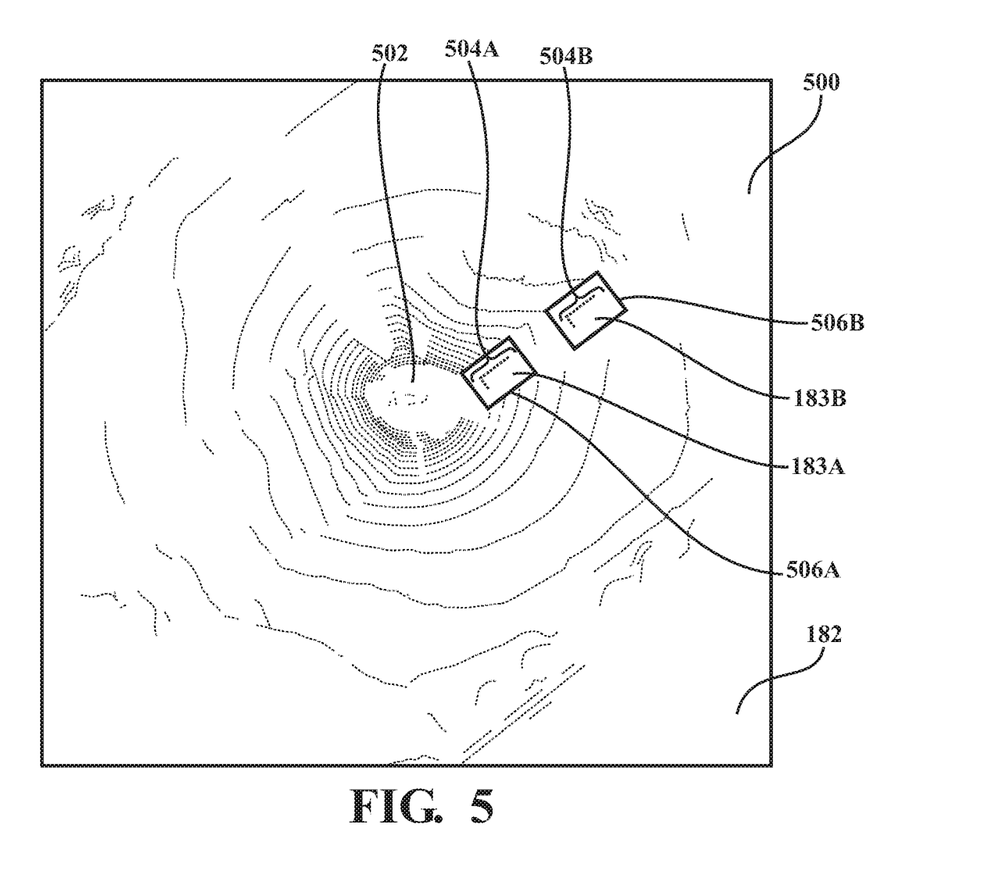
FIG. 5 illustrates one example of a bird's eye view of point cloud data training data that includes two objects that have been annotated with original annotation data.

In this example, the training data 500 includes two original objects 183A and 183B. The original object 183A is formed by a portion of points 504A found in the three-dimensional point cloud of the training data 500, while the original object 183B is formed by a portion of points 504B found in the three-dimensional point cloud of the training data 500. In addition, the original objects 183A and 183B have been further annotated with annotation data 506A and 506B, respectively. The annotation data 506A and 506B may be in the form of one or more boxes that identify the objects and/or could include object identifying information, such as the type of object, similar to what was mentioned in FIG. 4.

Figure 6A:
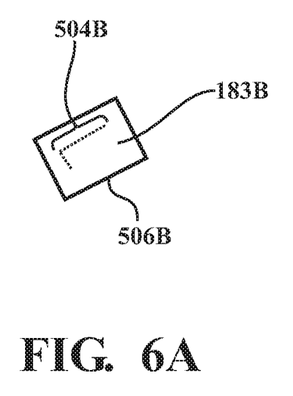
FIGS. 6A, 6B, and 6C illustrate an original object that has been annotated with original information and two types of synthetic objects that have been annotated with synthetic information, respectively.
Figure 6B:
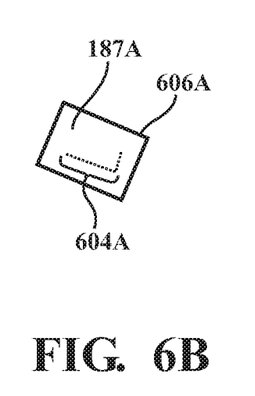

Referring to FIG. 6A, as previously described, the original object 183B may be made up of the portion of the points 504B of the point cloud of the training data 500 and annotated with the annotation data 506B. The duplication module 172 causes the processor(s) 110 to duplicate the original object 183B by duplicating the portion of the points 504B of the point cloud and the annotation data 506B. In one example, this duplicated portion of the points 504B of the point cloud and the annotation data 506B can then be inserted into the training data 500 as a third object. However, because this third object is a duplicate of an original object, such as original object 183B, this third object is a synthetic object. Thus, the training data 500, after insertion of the duplicated object, could be considered as synthetic training data, such as the synthetic training data 185.

In addition to duplicating original objects, such as the original objects 183A and 183B, and inserting them into training data, the transformation module 174 can also transform the duplicated object before it is inserted into the training data 500. For example, referring to FIG. 6B, a synthetic object 187A is shown that is made up of points 604A and annotated with annotation data 606A. The synthetic object 187A is essentially a duplicate of the original object 183B but has been rotated approximately 200°. As such, at least a portion of the points 504B of the original object 183B have been duplicated as the points 604A of the synthetic object 187A. Furthermore, annotation data 506B of the original object 183B have also been duplicated as well as annotation data 606A. The major difference in this example is that the transformation module 174 cause the processor(s) 110 to rotate this object and the points 604A that make up the synthetic object 187A. After this transformation has occurred, the synthetic object 187A could then be inserted into the training data 500

Figure 6C:
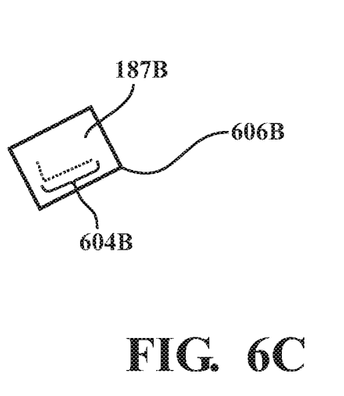

FIG. 6C illustrates another synthetic object 187B. The synthetic object 187B is essentially a duplicate of the original object 183B but has been inverted. As such, the points 604B that make up the synthetic object 187B have been duplicated and inverted from the original object 183B. The annotation data 606B is essentially a copy of the annotation data 506B of the original object 183B. Like before, after this transformation has occurred, the synthetic object 187B could then be inserted into the training data 500

The insertion module 173 may cause the processor(s) 110 to insert one or more of these synthetic objects, such as the synthetic objects 187A and/or the synthetic object 187B, into the training data, which could be training data 500 in the form of a three-dimensional point cloud. For example, referring to FIG. 7, this figure illustrates the training data 500 in the form of the point cloud, but now includes synthetic objects, such as synthetic objects 187C and/or 187D. The synthetic objects 187C and/or 187D may be duplicates of one or more original objects from either an original form of the training data 500 or another training data set. In one example, the synthetic objects 187C and 187D are duplicates of the original object 183B that have been rotated, inverted, flipped, and the like and inserted into the training data 500, essentially creating synthetic training data, such as the synthetic training data 185 stored on the data store(s) 180.

Figure 7:
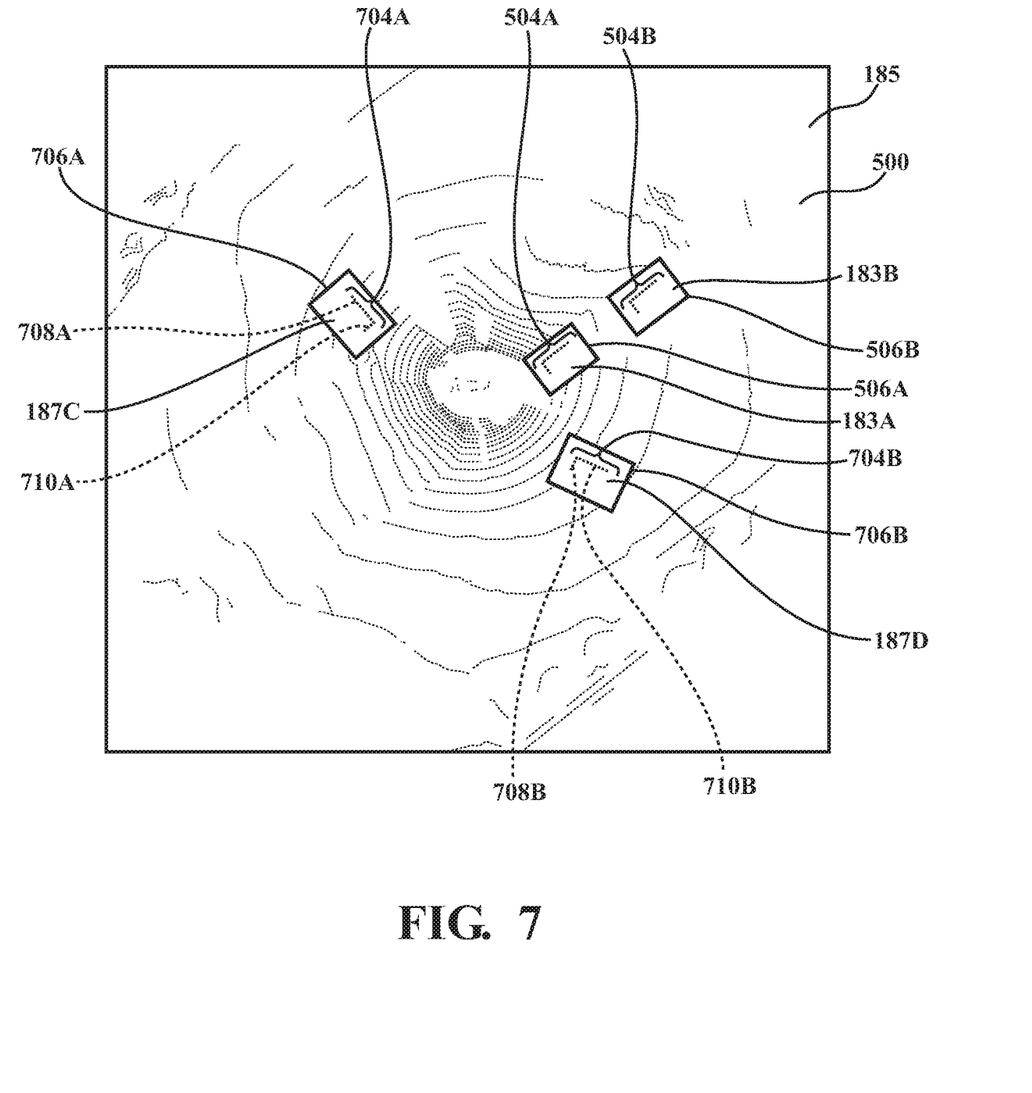
FIG. 7 illustrates a bird's eye view of training data that has two synthetic objects inserted into the training data.

Generally, the insertion module 173A causes the processor(s) 110 to insert the synthetic objects, such as 187C and/or 187D with respect to the ego vehicle 502. As such, the points 704A that form the synthetic object 187C and the points 704B that form the synthetic object 187D should be such that edges defined by the points 704A (illustrated as edges 708A and 710A), and the points 704B (illustrated as edges 708B and 710B) should generally face towards the ego vehicle 502.

Moreover, the ego vehicle 502 should generally be viewed as the center of the point cloud of the training data 500. As such, the sensors of the ego vehicle 502, which may be LIDAR sensors, should be able to detect the edges of nearby objects. As such, the edges should substantially face the ego vehicle 502. As such, when inserting the synthetic objects 187C and/or 187D, the insertion module 173 causes the processor(s) 110 to detect the edges and, when inserting the synthetic objects 187C and/or 187D into the training data 500, do so in such a way that the edges 708A and 710A of the synthetic object 187C and the edges 708B and 710B of the synthetic object 187D generally face the ego vehicle 502 to make for more realistic synthetic images. As such, the transformation module 174 may need to rotate, invert, or otherwise transform the synthetic objects 187C and/or 187D such that the edges 708A and 710A of the synthetic object 187C and the edges 708B and 710B of the synthetic object 187D generally face towards the ego vehicle 502.

In addition, the transformation module 174 may cause the processor(s) 110 to reduce the number of points that form the synthetic object based on the distance of the synthetic object with relation to the ego vehicle 502. For example, as the synthetic object is placed further and further away from the ego vehicle 502, the transformation module 174 may cause the processor(s) 110 to reduce the number of points forming the synthetic object. The reasoning for this reduction in the number of points forming the synthetic object is based on real-world data, which has shown that objects detected in the real world by LIDAR sensors typically see a reduction in the points that form the objects as the distance from the ego vehicle 502 increases. As such, the transformation module 174 can cause the processor(s) 110 to perform a transformation of the duplicated data to reduce the number of points so as to represent an object more realistically.

Returning to FIG. 2, the bird's eye view generating module 175 may include instructions that, when executed by the processor(s) 110, cause the processor(s) 110 to generate a bird's eye view of the training data 182 such as illustrated in FIG. 7 as the training data 500. As synthetic objects, such as synthetic objects 187C and/or 187D, are added to the bird's eye view version of the training data 500, the transformation module 174 updates the synthetic training data to include the transformation of the synthetic object as they are inserted into the training data. The insertion module can then cause the processor(s) 110 to insert the synthetic object within the bird's eye view version of the training, and update the training data to include the synthetic object as inserted within the bird's eye view.

By duplicating already annotated portions of training data, such as objects in the three-dimensional point cloud, and then reinserting them into training data, additional objects that have already been annotated and did not require manual annotation, which may be time-consuming and tedious, can be quickly and easily added to training data to make for more complex training data for more complete training of machine learning algorithms, such as object detection algorithms in this particular example.

Figure 8:
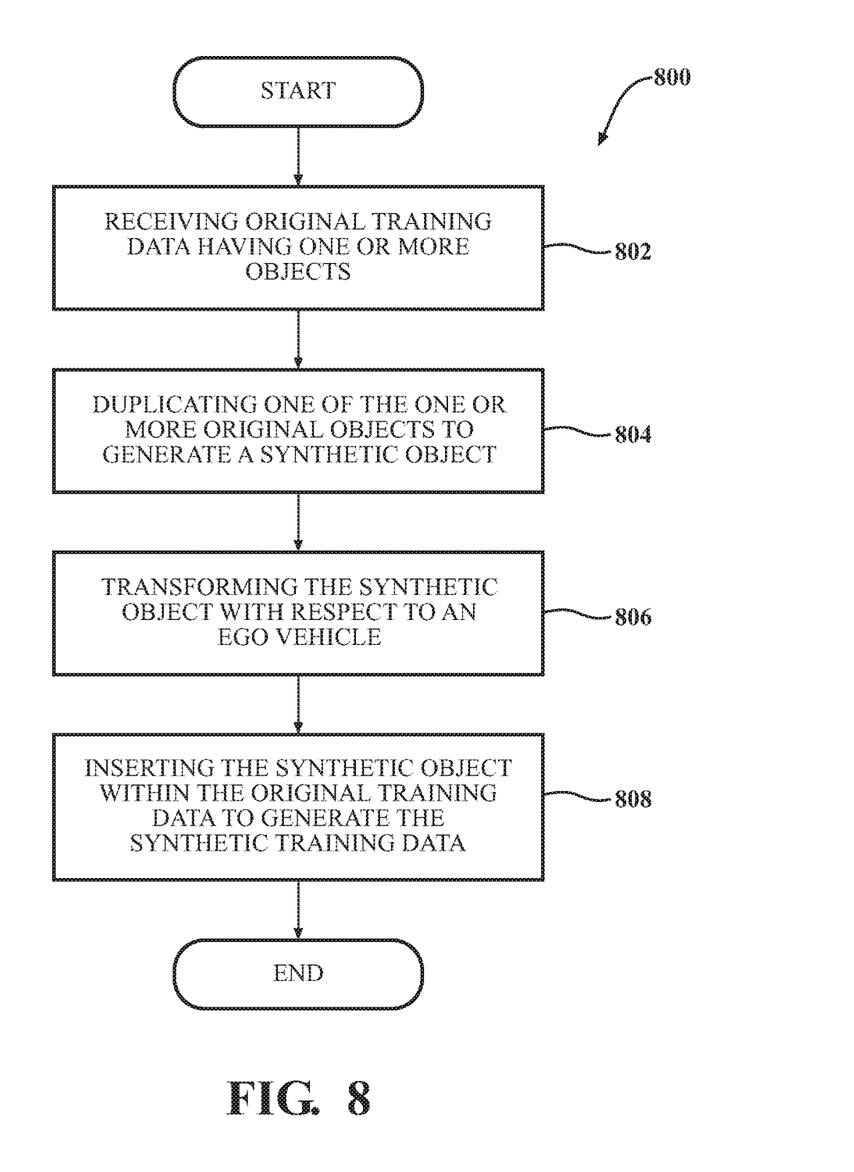
FIG. 8 illustrates a method for generating synthetic training data.

Referring to FIG. 8, a method 800 for generating synthetic training data is shown. The method 800 will be described from the viewpoint of the vehicle 100 of FIG. 1 and the synthetic training data generation system 150 of FIG. 2. However, it should be understood that this is just one example of implementing the method 800. While the method 800 is discussed in combination with the synthetic training data generation system 150, it should be appreciated that the method 800 is not limited to being implemented within the synthetic training data generation system 150, but is instead one example of a system that may implement the method 800.

In step 802, the receiving module 171 causes the processor(s) 110 to receive the original training data 182. The original training data 182 may be in the form of a three-dimensional point cloud and having one or more original objects 183 formed by at least a portion of the three-dimensional point cloud. The one or more original objects 183 may be annotated with original annotation data.

In step 804, the duplication module 172 causes the processor(s) 110 to duplicate one of the one or more original objects 183 to generate a synthetic object 187. The synthetic object 187 may be formed of duplicate portions of the three-dimensional point cloud that formed one of the one or more original objects 183 and may be annotated with synthetic annotated data. The synthetic annotated data may be a duplication of the original annotation data of the one or more original objects.

In step 806, the transformation module 174 may cause the processor(s) 110 to insert the synthetic object 187 within the original training data 182 to generate the synthetic training data 185. Moreover, the transformation module 174 can transform the duplicated object before it is inserted into the training data. For example, referring to FIG. 6B, a synthetic object 187A is shown that is made up of points 604A and annotated with annotation data 606B. The synthetic object 187A is essentially a duplicate of the original object 183A but has been rotated approximately 200°. As such, at least a portion of the points 504A of the original object 183B have been duplicated as the points 604A of the synthetic object 187A. Furthermore, annotation data 506A of the original object 183A have also been duplicated as well as annotation data 606B. The major difference in this example is that the transformation module 174 cause the processor(s) 110 to rotate this object in the points 604A that make up the synthetic object 187A. In step 808, the insertion module 173 causes the processor(s) 110 to insert the synthetic object 187 within the original training data 182 to generate the synthetic training data 185.

FIG. 1 will now be discussed in full detail as an example environment within which the system and methods disclosed herein may operate. In one or more embodiments, the vehicle 100 is an autonomous vehicle, but could also be a nonautonomous or semi-autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the synthetic training data generation system 150 to ensure the vehicle 100 remains within defined state constraints.

The vehicle 100 can include the processor(s) 110. In one or more arrangements, the processor(s) 110 can be a main processor of the vehicle 100. For instance, the processor(s) 110 can be an electronic control unit (ECU). The vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110 and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. The sensor system 120 can include one or more environment sensors configured to acquire, and/or sense driving environment data. "Driving environment data"

includes data or information about the external environment in which an autonomous vehicle is located or one or more portions thereof. For example, the one or more environment sensors can be configured to detect, quantify and/or sense obstacles in at least a portion of the external environment of the vehicle 100 and/or information/data about such obstacles. Such obstacles may be stationary objects and/or dynamic objects. The one or more environment sensors can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. However, it will be understood that the embodiments are not limited to the particular sensors described. As an example, in one or more arrangements, the sensor system 120 can include one or more LIDAR sensors 121, one or more radar sensors 122, one or more sonar sensors 123, and/or one or more camera sensors 124. In one or more arrangements, the one or more cameras sensors 124 can be high dynamic range (HDR) cameras or infrared (IR) cameras.

The vehicle 100 can include an input system 140. An "input system" includes any device, component, system, element, or arrangement or groups thereof that enable information/data to be entered into a machine. The input system 140 can receive an input from a vehicle passenger (e.g., a driver or a passenger). The vehicle 100 can include an output system 142. An "output system" includes any device, component, or arrangement or groups thereof that enable information/data to be presented to a vehicle passenger (e.g., a person, a vehicle passenger, etc.).

The vehicle 100 can include one or more vehicle control system(s) 130. Various examples of the vehicle control system(s) 130 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a steering control 131 for controlling the steering of the vehicle 100, a throttle control 132 for controlling the throttle of the vehicle 100, a braking control 133 for controlling the braking of the vehicle 100, and/or a transmission control 134 for controlling the transmission and/or other powertrain components of the vehicle 100. Each of these systems can include one or more devices, components, and/or a combination thereof, now known or later developed.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving module(s) 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, obstacles, or other environmental features, including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle control system(s) 130.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for generating synthetic training data, the system comprising:
one or processors; and
a memory in communication with the one or more processors, the memory having:
a receiving module, the receiving module having instructions that, when executed by the one or more processors, cause the one or more processors to receive original training data, the original training data being in the form of a three-dimensional point cloud generated by a sensor and having one or more original objects formed by at least a portion of the three-dimensional point cloud generated by the sensor, the one or more original objects being annotated with original annotation data,
a duplication module, the duplication module having instructions that, when executed by the one or more processors, cause the one or more processors to duplicate one of the one or more original objects to generate a synthetic object, the synthetic object being formed of duplicate portions of the three-dimensional point cloud generated by the sensor that formed the one of the one or more original objects and being annotated with synthetic annotated data, the synthetic annotated data being a duplication of the original annotation data of the one or more original objects, and an insertion module, the insertion module having instructions that, when executed by the one or more processors, cause the one or more processors to insert the synthetic object within the original training data to generate the synthetic training data.

2. The system of claim 1, wherein the memory further comprises a transformation module, the transformation module having instructions that, when executed by the one or more processors, cause the one or more processors to transform the synthetic object with respect to an ego vehicle.

3. The system of claim 2, wherein the transformation module further comprises instructions that, when executed by the one or more processors, cause the one or more processors to reduce a number of points forming the synthetic object based on a distance between the synthetic object and the ego vehicle in the synthetic training data.

4. The system of claim 2, wherein the transformation module further comprises instructions that, when executed by the one or more processors, cause the one or more processors to:
identify one or more outer edges of the synthetic object; and
rotate the synthetic object such that the one or more outer edges of the synthetic object face the ego vehicle.

5. The system of claim 1, wherein the original annotated data includes a bounding box and an object identifier.

6. The system of claim 1, wherein:
the memory further comprises a bird's eye view generating module, having instructions that, when executed by the one or more processors, cause the one or more processors to generate a bird's eye view of the original training data; and
wherein the insertion module further comprises instructions that, when executed by the one or more processors, cause the one or more processors to insert the synthetic object within the bird's eye view, and update the synthetic training data to include the synthetic object as inserted within the bird's eye view.

7. The system of claim 1, wherein:
the memory further comprises a bird's eye view generating module, having instructions that, when executed by the one or more processors, cause the one or more processors to generate a bird's eye view of the original training data;
wherein the insertion module further comprises instructions that, when executed by the one or more processors, cause the one or more processors to insert the synthetic object within the bird's eye view;
wherein the memory further comprises a transformation module, the transformation module having instructions that, when executed by the one or more processors, cause the one or more processors to transform the synthetic object with respect to an ego vehicle within the bird's eye view to generate a transformation of the synthetic object; and
wherein the insertion module further comprises instructions that, when executed by the one or more processors, cause the one or more processors to update the synthetic training data to include the transformation of the synthetic object as inserted and transformed within the bird's eye view.

8. A method for generating synthetic training data, the method comprising the steps of:
receiving original training data, the original training data being in the form of a three-dimensional point cloud generated by a sensor and having one or more original objects formed by at least a portion of the three-dimensional point cloud generated by the sensor, the one or more original objects being annotated with original annotation data;
duplicating the one or more original objects to generate a synthetic object, the synthetic object being formed of duplicate portions of the three-dimensional point cloud generated by the sensor that formed the one of the one or more original objects and being annotated with synthetic annotated data, the synthetic annotated data being a duplication of the original annotation data of the one or more original objects; and
inserting the synthetic object within the original training data to generate the synthetic training data.

9. The method of claim 8, further comprising the step of transforming the synthetic object with respect to an ego vehicle.

10. The method of claim 9, wherein the step of transforming the synthetic object further comprises the step of reducing a number of points forming the synthetic object based on a distance between the synthetic object and the ego vehicle in the synthetic training data.

11. The method of claim 9, wherein the step of transforming the synthetic object further comprises the steps of:
identifying one or more outer edges of the synthetic object; and
rotating the synthetic object such that the one or more outer edges of the synthetic object face the ego vehicle.

12. The method of claim 8, wherein the original annotated data includes a bounding box and an object identifier.

13. The method of claim 8, further comprising the steps of:
generating a bird's eye view of the original training data;
inserting the synthetic object within the bird's eye view; and
updating the synthetic training data to include the synthetic object as inserted within the bird's eye view.

14. The method of claim 8, further comprising the steps of:
generating a bird's eye view of the original training data;
inserting the synthetic object within the bird's eye view;
transforming the synthetic object with respect to an ego vehicle within the bird's eye view; and
updating the synthetic training data to include the transformation of the synthetic object as inserted and transformed within the bird's eye view.

15. A non-transitory computer-readable medium storing instructions for generating synthetic training data that, when executed by one or more processors, cause the one or more processors to:
receive original training data, the original training data being in the form of a three-dimensional point cloud generated by a sensor and having one or more original objects formed by at least a portion of the three-dimensional point cloud generated by the sensor, the one or more original objects being annotated with original annotation data;
duplicate one of the one or more original objects to generate a synthetic object, the synthetic object being formed of duplicate portions of the three-dimensional point cloud generated by the sensor that formed the one of the one or more original objects and being annotated with synthetic annotated data, the synthetic annotated data being a duplication of the original annotation data of the one or more original objects; and insert the synthetic object within the original training data to generate the synthetic training data.

16. The non-transitory computer-readable medium of claim 15, further comprising the step of transforming the synthetic object with respect to an ego vehicle.

17. The non-transitory computer-readable medium of claim 16, further comprising instructions that, when executed by one or more processors, cause the one or more processors to reduce a number of points forming the synthetic object based on a distance between the synthetic object and the ego vehicle in the synthetic training data.

18. The non-transitory computer-readable medium of claim 16, further comprising instructions that, when executed by one or more processors, cause the one or more processors to:

identify one or more outer edges of the synthetic object; and rotate the synthetic object such that the one or more outer edges of the synthetic object face the ego vehicle.

19. The non-transitory computer-readable medium of claim 15, further comprising instructions that, when executed by one or more processors, cause the one or more processors to:

generate a bird's eye view of the original training data;

insert the synthetic object within the bird's eye view; and update the synthetic training data to include the synthetic object as inserted within the bird's eye view.

20. The non-transitory computer-readable medium of claim 15, further comprising instructions that, when executed by one or more processors, cause the one or more processors to:

generate a bird's eye view of the original training data;

insert the synthetic object within the bird's eye view;

transform the synthetic object with respect to an ego vehicle within the bird's eye view; and update the synthetic training data to include a transformation of the synthetic object as inserted and transformed within the bird's eye view.

* * * * *